United States Patent
Whitney et al.

(10) Patent No.: US 10,404,822 B2
(45) Date of Patent: Sep. 3, 2019

(54) PREDICTIVE ROLLUP AND CACHING FOR APPLICATION PERFORMANCE DATA

(71) Applicant: AppDynamics LLC, San Francisco, CA (US)

(72) Inventors: Jonathan Whitney, Belmont, CA (US); Zhijiang Lu, Union City, CA (US); Rafal Rusin, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 15/142,882

(22) Filed: Apr. 29, 2016

(65) Prior Publication Data
US 2017/0316321 A1    Nov. 2, 2017

(51) Int. Cl.
H04L 29/08     (2006.01)
G06F 16/957    (2019.01)
G06N 20/00     (2019.01)

(52) U.S. Cl.
CPC ...... H04L 67/2847 (2013.01); G06F 16/9574 (2019.01); G06N 20/00 (2019.01)

(58) Field of Classification Search
None
See application file for complete search history.

(56) References Cited

U.S. PATENT DOCUMENTS

2003/0005251 A1    1/2003   Wilson et al.
2003/0041214 A1    2/2003   Hirao et al.
2007/0088919 A1 *  4/2007   Shen ............... G06F 12/0815
                                                          711/154
2009/0271511 A1    10/2009  Peracha
2010/0082267 A1    4/2010   Schimert et al.
2011/0302164 A1    12/2011  Krishnamurthy et al.
2014/0101278 A1    4/2014   Raman et al.
2015/0058092 A1    2/2015   Rea et al.
2015/0288591 A1    10/2015  Puvvada
2016/0034919 A1    2/2016   Borah

OTHER PUBLICATIONS

Huang et al. "A User-Aware Prefetching Mechanism for Video Streaming", WWW: Internet and Web Information Systems, 6, 353-374, 2003.*
Padmanabhan et al. "Using Predictive Prefetching to Improve World Wide Web Latency", ACM SIGCOMM Computer Communication Review, 1996, pp. 22-36.*
International Search Report dated Jul. 29, 2016 in connection with PCT/US2016/030240.

* cited by examiner

Primary Examiner — Li Wu Chang
(74) Attorney, Agent, or Firm — Behmke Innovation Group LLC; James Behmke; Stephen D. LeBarron

(57) ABSTRACT

In one aspect, a system for pre-fetching performance data in a monitored environment is disclosed. The system can include a processor; a memory; and one or more modules stored in the memory. The one or more modules are executable by the processor to perform operations including: record queries that request for application performance data with latencies longer than a threshold; learn access patterns in the recorded queries with latencies longer than the threshold; pre-fetch and cache the application performance data requested by the recorded queries before the same recorded queries are requested next time; and provide the pre-fetched application performance data from the cache when the same recorded queries are requested next time.

22 Claims, 5 Drawing Sheets

PREDICTIVE ROLLUP AND CACHING FOR APPLICATION PERFORMANCE DATA

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations for predictively rolling up and caching application performance data are disclosed.

In one aspect, a system for pre-fetching performance data in a monitored environment is disclosed. The system can include a processor; a memory; and one or more modules stored in the memory. The one or more modules are executable by the processor to perform operations including: record queries that request for application performance data with latencies longer than a threshold; learn access patterns in the recorded queries with latencies longer than the threshold; pre-fetch and cache the application performance data requested by the recorded queries before the same recorded queries are requested next time; and provide the pre-fetched application performance data from the cache when the same recorded queries are requested next time.

The system can be implemented in various ways to include one or more of the following features. For example, the one or more modules stored in the memory can be executable by the processor to perform operations including: determine newly streamed performance data is relevant to the pre-fetched and cached performance data; and append the pre-fetched and cached data with the newly streamed performance data that are determined to be relevant. The one or more modules stored in the memory can be executable by the processor to pre-fetch and cache the application performance data by performing operations including: identify a type of performance data; identify a roll up process mandated by the recorded queries; and pre-processing the identified type of performance data using the identified roll up process. The roll up process can include raw data in minute interval, average hourly data, average daily data, average weekly data, average monthly data, or average yearly data. The access pattern can include hourly, daily, weekly, monthly, or yearly access. The application performance data can include time needed to complete a business transaction. The application performance data cam include time need to access a database. The application performance data can include resource usage rates.

In another aspect a method for pre-fetching performance data in a monitored environment is disclosed. The method can include receiving a query for application performance data associated with the monitored environment; determining whether latency of the received query exceeds a threshold; recording the query based on the determining that the latency of the received query exceeds the threshold; learning an access pattern in the recorded query with the latency longer than the threshold; pre-fetching and caching the application performance data requested by the recorded query before the same recorded query is requested next time; providing the pre-fetched application performance data from the cache when the same recorded query is requested next time; and updating the learned access pattern based on data obtained during the next time when the same recorded query is requested.

The method can be implemented in various ways to include one or more of the following features. For example, the method can include determining whether newly streamed performance data are relevant to the pre-fetched and cached performance data; and appending the pre-fetched and cached data with the newly streamed performance data that are determined to be relevant. The method can include identifying a type of performance data; identifying a roll up process mandated by the recorded queries; and pre-processing the identified type of performance data using the identified roll up process. The roll up process can include raw data in minute interval, average hourly data, average daily data, average weekly data, average monthly data, or average yearly data. The access pattern can include hourly, daily, weekly, monthly, or yearly access. The application performance data can include time needed to complete a business transaction. The application performance data can include time need to access a database. The application performance data can include a resource usage rate.

In yet another aspect, a non-transitory computer readable medium embodying instructions when executed by a processor to cause operations to be performed is disclosed. The operations include: recording a query requesting performance data that has a latency that exceeds a threshold latency time; learning an access pattern in the recorded query with the latency longer than the threshold; pre-fetching and caching the application performance data requested by the recorded query before the same recorded query is requested next time; and providing the pre-fetched application performance data from the cache when the same recorded query is requested next time.

The non-transitory computer readable medium can be implemented in various ways to include one or more of the following features. For example, the operations can include updating the learned access pattern based on data obtained during the next time when the same recorded query is requested. The operations can include: determining whether newly streamed performance data are relevant to the pre-fetched and cached performance data; and appending the pre-fetched and cached data with the newly streamed performance data that are determined to be relevant. The operations can include: identifying a type of performance data; identifying a roll up process mandated by the recorded queries; and pre-processing the identified type of performance data using the identified roll up process. The roll up process can include raw data in minute interval, average hourly data, average daily data, average weekly data, average monthly data, or average yearly data. The access pattern can include hourly, daily, weekly, monthly, or yearly access.

DETAILED DESCRIPTION

Figure 1B:
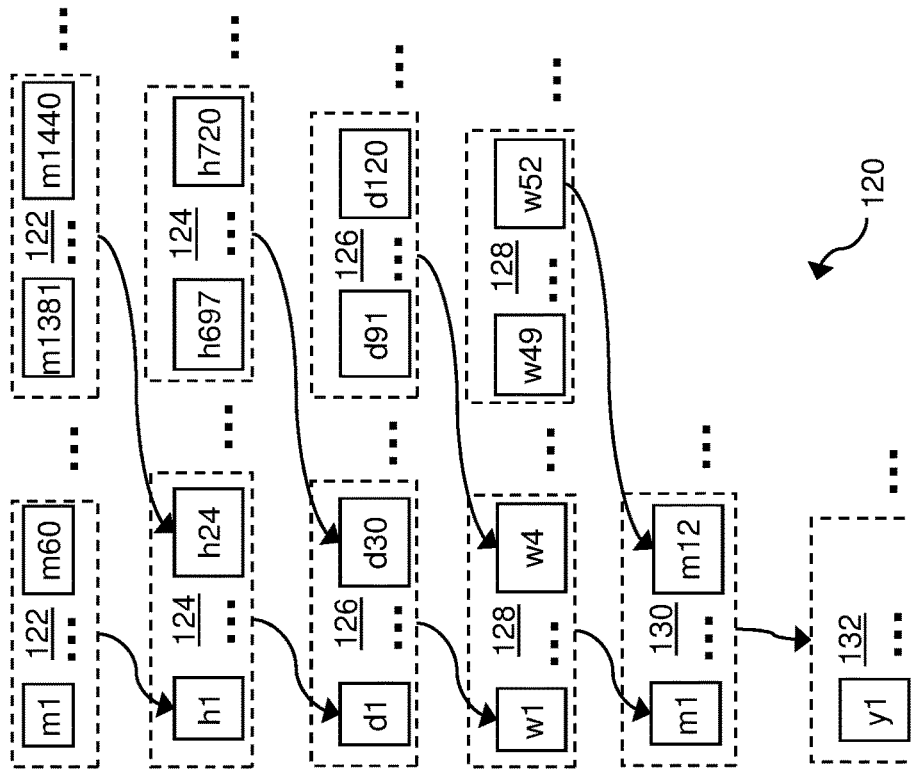
FIG. 1B is a block diagram showing exemplary techniques for roll up of performance data from most granular to least granular.

As the complexity of the monitored application environment increases, application intelligence platforms allow monitoring of increasing amount of application performance data. The application intelligence platforms allow users to create a number of dashboards and alerting rules based on near real-time or historical application performance data. Due to the sheer size of the monitored application performance data, only part of the data can be pre-processed (rolled up) from the raw data in the form that user wishes to view the data, and only part of the data is cached in memory and can be readily served to the user interface clients. From time to time, the end user endures long latency in loading the dashboards or the alerting rule might not finish evaluating the performance data in-time and alert the end user in a timely manner as needed, due to the heavy-lifting to process the requested data in the data backends.

The technology disclosed in this patent document provides for dynamic and efficient application intelligence platforms, systems, devices, methods, and computer readable media including non-transitory type that embody instructions for causing a machine including a processor to perform various operations disclosed in this patent document to obtain the desired application intelligence data. Specifically, the disclosed technology provides for predictively rolling up and caching of application performance data. Using machine learning of user query request for application performance data, the application performance data that a given user is most likely to request can be predicted and pre-processed or pre-fetched so that the desired application performance data can be ready to be displayed to the user before the query is received. The machine learning monitors the history of the queries requested over time to identify a pattern for each query. Based on the identified pattern, certain query results are pre-fetched before the expected query request.

The ability to predictively roll up and cache application performance data can provide a number of advantages. For example, a sluggish user interface (UI) due to slow backend processing is one of the major source of user frustration and could damage customer loyalty. Finding innovative ways of making the system lightning fast can be as important as the features included in a product release. In addition, by identifying patterns in queries requested, the most requested queries can be identified to determine which application performance data should be stored. Storage resource allocation is a major cost burden in the application performance monitoring systems due to the vast amount of data collected daily. In addition to identifying the most important application performance data to pre-fetch and store, the predictive machine learning can be applied to determine how long each application performance data can be stored. For example, some of the application performance data can be simply cached for a short period of time rather than archiving for a longer duration. Moreover, the actual amount of data that must be cached or archived can be reduced based on the predictive machine learning of query requests.

Predictive Roll Up and Caching of Application Performance Data Techniques

FIGS. 1A, 1B, 1C, and 1D are process flow diagrams and block diagrams showing exemplary techniques, such as method 100, for predictive roll up and caching of application performance data. In an application intelligence platform, agents are deployed to monitor various performance data in an application environment. The deployed agents send the monitored application performance data to the controller for processing and storing the monitored data. As the agents collect more and more monitored data, the disclosed technology for predictive roll up and caching of application performance data can be used to pre-fetch the desired application performance data and cache the pre-fetched data before the request is received. The techniques or method 100 illustrated and described with respect to FIG. 1A can be combined with any number of additional techniques and sub-techniques from FIGS. 1B, 1C, and 1D. Also, while possible, not all of the additional techniques and sub-techniques illustrated and described with respect to FIGS. 1B, 1C, and 1D need to be performed together and techniques illustrated in any of the FIGURES can be combined with techniques in any other FIGURE or FIGURES.

The predictive roll up and caching of application performance data technique 100 can be performed by each agent that monitors an application environment, such as a corresponding server machine. An application intelligence architecture that includes agents and controllers in communications with one another according to the disclosed technology is described below with respect to FIGS. 2, 3, and 4. In this manner, each agent can perform predictive roll up and caching of application performance data specific for the machine monitored. Thus at least some of the monitored data processing and intelligence can be pushed to the agents rather than being exclusively being performed at the controller. In some implementations, the predictive roll up and caching of application performance data can be performed at the controller for all the agents.

Figure 1A:
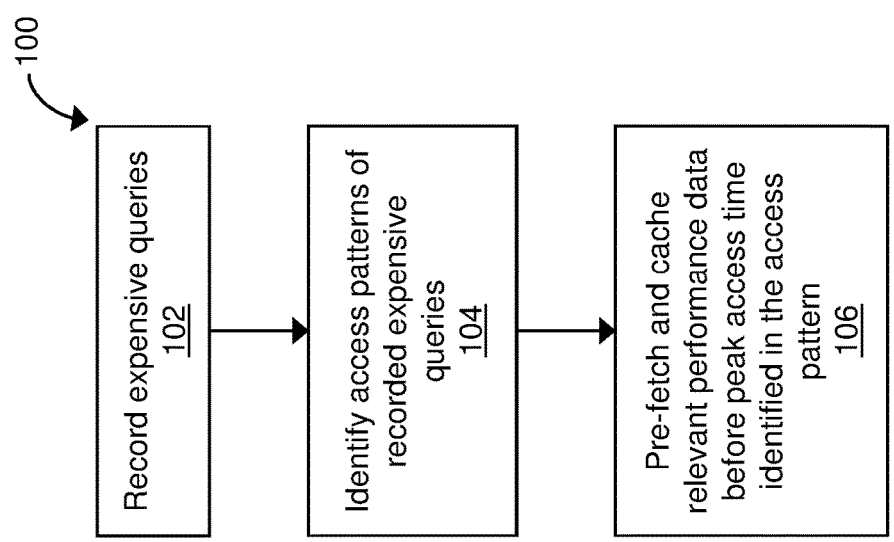
FIG. 1A is a process flow diagrams showing an exemplary technique for predictively rolling up and caching application performance data.

As shown in FIG. 1A, the process 100 for predictive roll up and caching of application performance data includes recording queries for application performance data that are determined to be resource expensive based on the latency (the time required to return the results of the queries) being above a preset threshold (102). From the recorded expensive queries, the access patterns of the expensive queries are learned (104). The access patterns can include hourly, daily, weekly or monthly patterns. The access pattern indicates, for example, when the same query is accessed every hour, every day, every week, or every month. Additional access pattern can indicate that the same query is accessed at certain time of the day, week, or month. For example, a user may always query for the highest resource consuming processes every morning at 8 AM, presumably the first action the user takes once arriving at work. Even when the same query is not performed exactly at the same time every day, the same query may be requested between certain time period every day. Based on the determined access pattern, the relevant application performance data are pre-fetched and cached in the way the predicted expensive queries mandate before the peak usage time (106). By pre-fetching the relevant performance data before the predicted time of the request, the relevant data can be immediately returned to the user for display.

FIG. 1B is a block diagram illustrating different exemplary process 120 for rolling up application performance data from most granular to least granular. In application performance monitoring, the default method of processing the performance data is to monitor and record the raw data in the most granular format (e.g., minute interval) (122). The minute-by-minute raw data is then processed or "rolled up" into the next granular format (e.g., hourly interval) (124). The roll up to the hourly format is performed by averaging every 60 minute interval data into one hourly data. Then 24 hourly data are rolled up by averaging the 24 hours of data into the next granular format, the daily data (126). The daily data can be rolled up into weekly data by averaging 7 days of data into one weekly data (128). The weekly data can be rolled up into monthly data by averaging 4 weeks of data into one monthly data (130). The monthly data can be rolled up into yearly data by averaging 12 months of data into 1 yearly data (132). Depending on the recorded expensive query, any number of these roll ups may need to be pre-processed before the peak access time and the resultant performance data cached in memory ready to be provided when the actual query is requested.

Figures 1C, 1D:
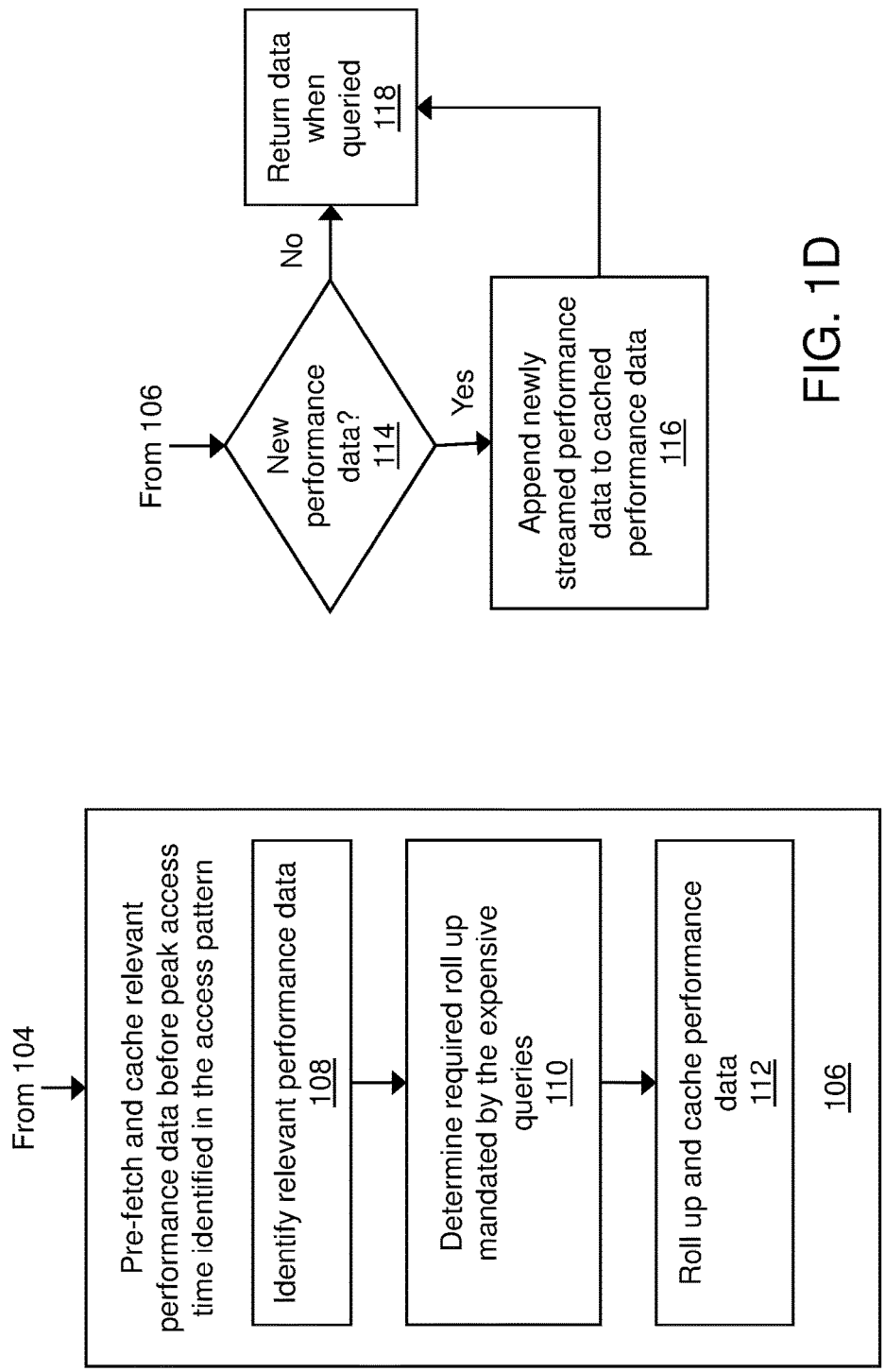
FIG. 1C is a process flow diagram showing an exemplary technique for pre-fetching relevant performance data before peak access times.
FIG. 1D is a process flow diagram showing an exemplary process for appending newly streamed performance data.

FIG. 1C is a process flow diagram of exemplary processes for predictively pre-fetching or pre-processing the expensive queries (106). The relevant application performance data requested by the expensive queries are identified (108). The roll up required to return the relevant application performance data in the way (e.g., hourly, daily, weekly, monthly, etc.) mandated by the recorded expensive queries is determined (110). The determined roll up of the relevant application performance data is performed and the result rolled up performance data are cached in memory before the peak access time (112). When the expensive queries are actually requested during the peak access time, the relevant data can be immediately returned to the user, thus avoiding the long latency.

When the above described roll up events are performed as a default, a tremendously large amount of data need to be stored. By using the predictive roll up and caching of performance data as disclosed in this patent document, the system can reduce the amount of data stored and the duration of storage required. For example, when the predictive roll up and caching technique 100 determines that certain performance data is never requested for the yearly average, the yearly roll up data may not need to be saved.

FIG. 1D is a process flow diagram of additional processes that can be performed during the operation of technique 100. When new performance data are detected to be streamed into the system that are also qualified to be returned by those pre-fetched expensive queries (114), the new performance data are processed and appended as a delta to the pre-fetched result that are already present in the in-memory cache (116). This way, the requests from the end users for the requested performance data can be promptly served from the in-memory cache and include all of the relevant data (118).

Application Intelligence Platform Architecture

Figure 2:
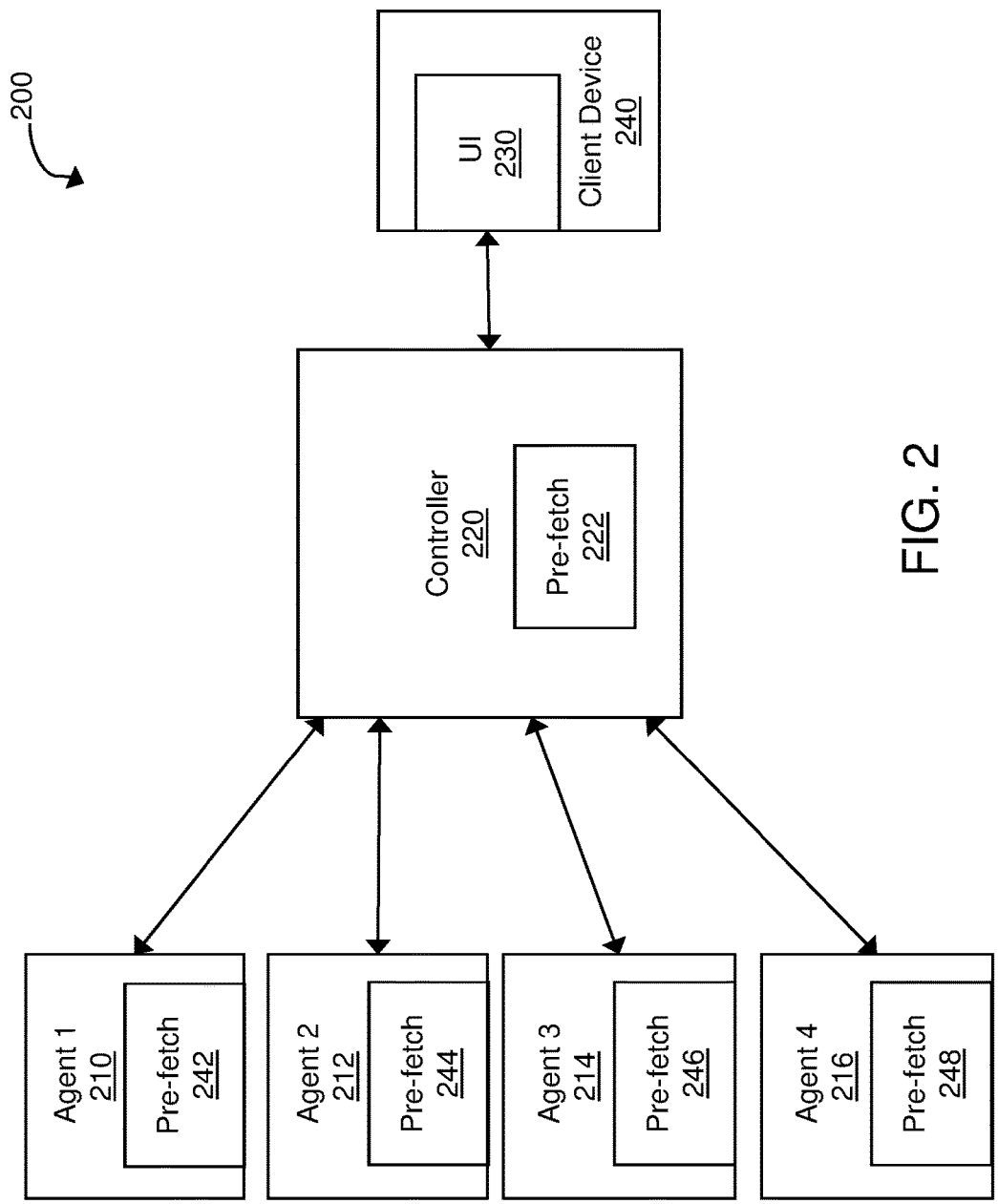
FIG. 2 is a block diagram of an exemplary application intelligence platform that can implement the predictively rolling up and caching application performance data using the disclosed technology, including the processes disclosed with respect to FIGS. 1A through 1D.

The disclosed technology for predictive roll up and caching of application performance data can be implemented in the controller or in some implementations, in agents and controllers of an application intelligence platform. FIG. 2 is a block diagram of an exemplary application intelligence platform 200 that can implement the predictive as disclosed in this patent document. The application intelligence platform is a system that monitors and collect metrics of performance data for an application environment being monitored. At the simplest structure, the application intelligence platform includes one or more agents 210, 212, 214, 216 and one or more controllers 220. While FIG. 2 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 220 is the central processing and administration server for the application intelligence platform. The controller 220 serves a browser-based user interface (UI) 230 that is the primary interface for monitoring, analyzing, and troubleshooting the monitored environment. The controller 220 can control and manage monitoring of business transactions distributed over application servers. Specifically, the controller 220 can receive runtime data from agents 210, 212, 214, 216 and coordinators, associate portions of business transaction data, communicate with agents to configure collection of runtime data, and provide performance data and reporting through the interface 230. The agent of the agents 210, 212, 214, 216 can include corresponding pre-fetch systems or modules 242, 244, 246, 248 for performing the predictive roll up and caching of application performance data as disclosed in this patent document. The interface 230 may be viewed as a web-based interface viewable by a client device 240. In some implementations, a client device 240 can directly communicate with controller 220 to view an interface for monitoring data. In some implementations where the overall ranking is obtained by combining the data from multiple agents, the controller 220 can include a pre-fetch system or module to predictively roll up and cache (i.e., pre-fetch) certain application performance data from the multiple agents before the request for the pre-fetched data is received. For example, in a node having multiple machines, each agent assigned to a machine can pre-fetch machine specific application performance data using the predictive machine learning techniques disclosed in this patent document. The controller can communicate with the multiple agents return the appropriate pre-fetch application performance data responsive to the request for the pre-fetch application performance data. In some implementations, an application may touch more than one machine and thus application performance data from multiple agents can be combined together by the controller.

In the Software as as Service (SaaS) implementation, a controller instance 220 is hosted remotely by a provider of the application intelligence platform 200. In the on-premise (On-Prem) implementation, a controller instance 220 is installed locally and self-administered.

The controllers 220 receive data from different agents 210, 212, 214, 216 deployed to monitor applications, databases and database servers, servers, and end user clients for the monitored environment. Any of the agents 210, 212, 214, 216 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes.

Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows between tiers and can be visualized in a flow map using lines between tiers. In addition, the lines indicating the traffic flows between tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 3:
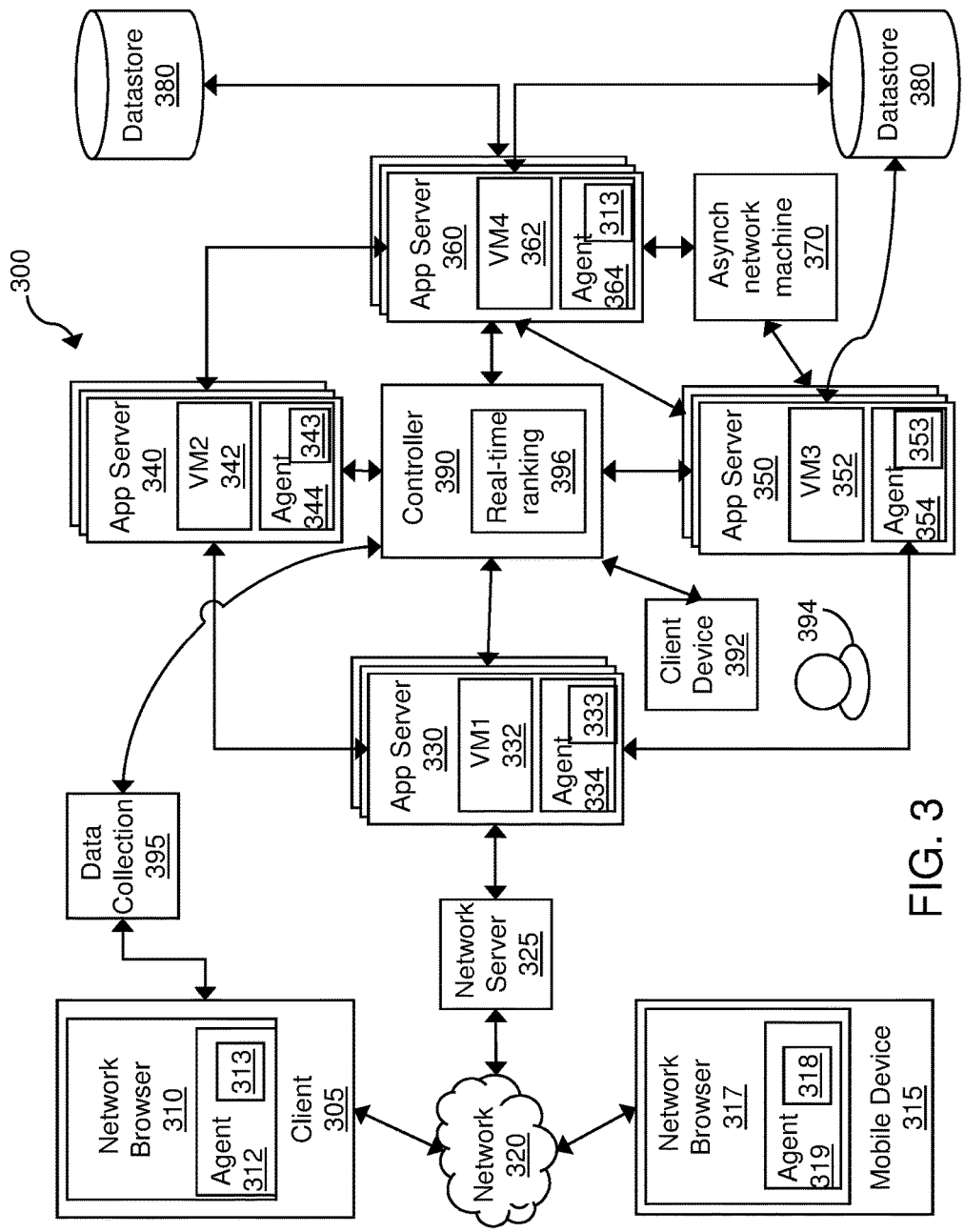
FIG. 3 is a block diagram of an exemplary implementation of the application intelligence platform for predictively rolling up and caching application performance data using the disclosed technology, including the processes disclosed with respect to FIGS. 1A through 1D.

FIG. 3 is a block diagram of an exemplary system 300 for predictive roll up and caching of application performance data as disclosed in this patent document, including the techniques disclosed with respect to FIGS. 1A, 1B, 1C, 1D, and 1E. The system 300 in FIG. 3 includes client device 305 and 392, mobile device 315, network 320, network server 325, application servers 330, 340, 350 and 360, agents 312, 319, 334, 344, 354 and 364, asynchronous network machine 370, data stores 380 and 385, controller 390, and data collection server 395. The agents 312, 319, 334, 344, 354 and 364 can include pre-fetch systems or modules 313, 318, 333, 343, 353 and 363 for performing predictive roll up and caching of application performance data as disclosed in this patent document. In some implementations, the controller 390 can also include a pre-fetch system or module 396 for performing predictive roll up and caching of application performance data as disclosed in this patent document. For example, when application performance data that expands across multiple agents are predictively rolled up and cached, the controller can include the pre-fetch system or module 396 in addition to or instead of the pre-fetch systems or modules 313, 318, 333, 343, 353 and 363 in the agents 312, 319, 334, 344, 354 and 364. In some implementations, the pre-fetch system or module 396, 222 can be implemented in a separate machine (e.g., a server) different from the one hosting the controller 390.

Client device 305 may include network browser 310 and be implemented as a computing device, such as for example a laptop, desktop, workstation, or some other computing device. Network browser 310 may be a client application for viewing content provided by an application server, such as application server 330 via network server 325 over network 320.

Network browser 310 may include agent 312. Agent 312 may be installed on network browser 310 and/or client 305 as a network browser add-on, downloading the application to the server, or in some other manner. Agent 312 may be executed to monitor network browser 310, the operating system of client 305, and any other application, API, or other component of client 305. Agent 312 may determine network browser navigation timing metrics, access browser cookies, monitor code, and transmit data to data collection 360, controller 390, or another device. Agent 312 may perform other operations related to monitoring a request or a network at client 305 as discussed herein.

Mobile device 315 is connected to network 320 and may be implemented as a portable device suitable for sending and receiving content over a network, such as for example a mobile phone, smart phone, tablet computer, or other portable device. Both client device 305 and mobile device 315 may include hardware and/or software configured to access a web service provided by network server 325.

Mobile device 315 may include network browser 317 and an agent 319. Mobile device may also include client applications and other code that may be monitored by agent 319. Agent 319 may reside in and/or communicate with network browser 317, as well as communicate with other applications, an operating system, APIs and other hardware and software on mobile device 315. Agent 319 may have similar functionality as that described herein for agent 312 on client 305, and may repot data to data collection server 360 and/or controller 390.

Network 320 may facilitate communication of data between different servers, devices and machines of system 300 (some connections shown with lines to network 320, some not shown). The network may be implemented as a private network, public network, intranet, the Internet, a cellular network, Wi-Fi network, VoIP network, or a combination of one or more of these networks. The network 320 may include one or more machines such as load balance machines and other machines.

Network server 325 is connected to network 320 and may receive and process requests received over network 320. Network server 325 may be implemented as one or more servers implementing a network service, and may be implemented on the same machine as application server 330 or one or more separate machines. When network 320 is the Internet, network server 325 may be implemented as a web server.

Application server 330 communicates with network server 325, application servers 340 and 350, and controller 390. Application server 330 may also communicate with other machines and devices (not illustrated in FIG. 3). Application server 330 may host an application or portions of a distributed application. The host application 332 may be in one of many platforms, such as including a Java, PHP, .Net, and Node.JS, be implemented as a Java virtual machine, or include some other host type. Application server 330 may also include one or more agents 34 (i.e. "modules"), including a language agent, machine agent, and network agent, and other software modules. Application server 330 may be implemented as one server or multiple servers as illustrated in FIG. 3.

Application 332 and other software on application server 330 may be instrumented using byte code insertion, or byte code instrumentation (BCI), to modify the object code of the application or other software. The instrumented object code may include code used to detect calls received by application 332, calls sent by application 332, and communicate with agent 334 during execution of the application. BCI may also be used to monitor one or more sockets of the application and/or application server in order to monitor the socket and capture packets coming over the socket.

In some embodiments, server 330 may include applications and/or code other than a virtual machine. For example, servers 330, 340, 350, and 360 may each include Java code, .Net code, PHP code, Ruby code, C code, C++ or other binary code to implement applications and process requests received from a remote source. References to a virtual machine with respect to an application server are intended to be for exemplary purposes only.

Agents 334 on application server 330 may be installed, downloaded, embedded, or otherwise provided on application server 330. For example, agents 334 may be provided in server 330 by instrumentation of object code, downloading the agents to the server, or in some other manner. Agent 334 may be executed to monitor application server 330, monitor code running in a virtual machine 332 (or other program language, such as a PHP, .Net, or C program), machine resources, network layer data, and communicate with byte instrumented code on application server 330 and one or more applications on application server 330.

Each of agents 334, 344, 354 and 364 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 334 may detect operations such as receiving calls and sending requests by application server 330, resource usage, and incoming packets. Agent 34 may receive data, process the data, for example by aggregating data into metrics, and transmit the data and/or metrics to controller 390. Agent 334 may perform other operations related to monitoring applications and application server 330 as discussed herein. For example, agent 334 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 390 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 334 may create a request identifier for a request received by server 330 (for example, a request received by a client 305 or 315 associated with a user or another source). The request identifier may be sent to client 305 or mobile device 315, whichever device sent the request. In embodiments, the request identifier may be created when a data is collected and analyzed for a particular business transaction.

Each of application servers 340, 350 and 360 may include an application and agents. Each application may run on the corresponding application server. Each of applications 342, 352 and 362 on application servers 340-360 may operate similarly to application 332 and perform at least a portion of a distributed business transaction. Agents 344, 354 and 364 may monitor applications 342-362, collect and process data at runtime, and communicate with controller 390. The applications 332, 342, 352 and 362 may communicate with each other as part of performing a distributed transaction. In particular, each application may call any application or method of another virtual machine.

Asynchronous network machine 370 may engage in asynchronous communications with one or more application servers, such as application server 350 and 360. For example, application server 150 may transmit several calls or messages to an asynchronous network machine. Rather than communicate back to application server 350, the asynchronous network machine may process the messages and eventually provide a response, such as a processed message, to application server 360. Because there is no return message from the asynchronous network machine to application server 350, the communications between them are asynchronous.

Data stores 380 and 385 may each be accessed by application servers such as application server 350. Data store 385 may also be accessed by application server 350. Each of data stores 380 and 385 may store data, process data, and return queries received from an application server. Each of data stores 380 and 385 may or may not include an agent.

Controller 390 may control and manage monitoring of business transactions distributed over application servers 330-360. In some embodiments, controller 390 may receive application data, including data associated with monitoring client requests at client 305 and mobile device 315, from data collection server 360. In some embodiments, controller 390 may receive application monitoring data and network data from each of agents 312, 319, 334, 344 and 354. Controller 390 may associate portions of business transaction data, communicate with agents to configure collection of data, and provide performance data and reporting through an interface. The interface may be viewed as a web-based interface viewable by client device 392, which may be a mobile device, client device, or any other platform for viewing an interface provided by controller 390. In some embodiments, a client device 392 may directly communicate with controller 390 to view an interface for monitoring data.

Client device 392 may include any computing device, including a mobile device or a client computer such as a desktop, work station or other computing device. Client computer 392 may communicate with controller 390 to create and view a custom interface. In some embodiments, controller 390 provides an interface for creating and viewing the custom interface as a content page, e.g., a web page, which may be provided to and rendered through a network browser application on client device 392.

Applications 332, 342, 352 and 362 may be any of several types of applications. Examples of applications that may implement applications 332-362 include a Java, PHP, .Net, Node.JS, and other applications.

Figure 4:
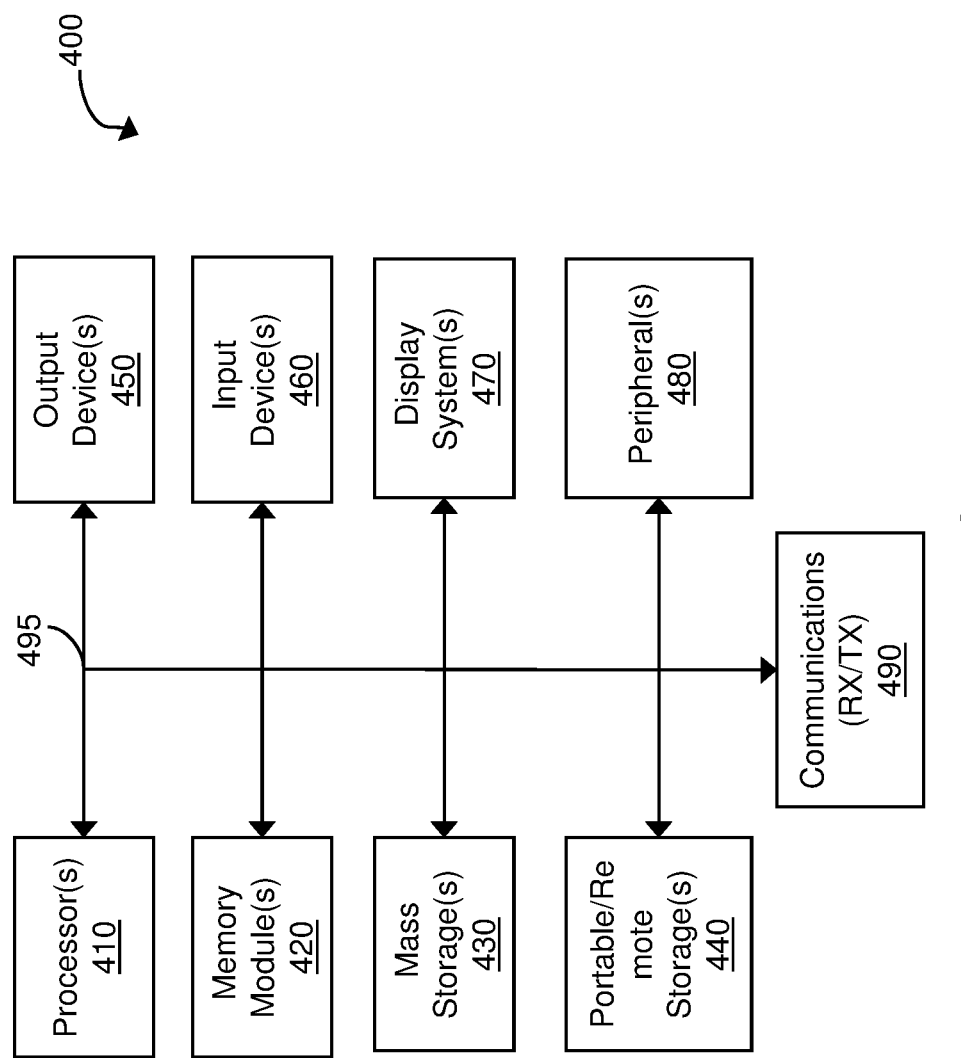
FIG. 4 is a block diagram of an exemplary computing system implementing the disclosed technology.

FIG. 4 is a block diagram of a computer system 400 for implementing the present technology. System 400 of FIG. 4 may be implemented in the contexts of the likes of clients 305, 392, mobile device 315, network server 325, servers 330, 340, 350, 360, a synchronous network machine 370 and controller 390.

The computing system 400 of FIG. 4 includes one or more processors 410 and memory 420. Main memory 420 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable or remote storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 620.

Portable storage device 440 operates in conjunction with a portable non-volatile storage medium, such as a compact disk, digital video disk, magnetic disk, flash storage, etc. to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 400 of FIG. 4 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for pre-fetching performance data in a monitored environment, including:
 a processor;
 a memory; and
 one or more modules stored in the memory and executable by the processor to perform operations including:
  record queries that request application performance data with latencies longer than a threshold;
  learn, via a machine learning process, access patterns in the recorded queries with latencies longer than the threshold, wherein the access pattern includes when and how often a same query is requested;
  based on the learned access patterns, pre-fetch and cache the application performance data requested by the recorded queries before the same recorded queries are requested next time, wherein prefetching includes:
   identifying a roll up process required by the recorded queries, wherein the roll up process includes processing data into a next granular format; and
  provide the pre-fetched application performance data from the cache when the same recorded queries are requested next time.

2. The system of claim 1, wherein the one or more modules stored in the memory and executable by the processor to perform operations including:
 determine newly streamed performance data is relevant to the pre-fetched and cached performance data; and append the pre-fetched and cached data with the newly streamed performance data that are determined to be relevant.

3. The system of claim 1, wherein the one or more modules stored in the memory and executable by the processor to pre-fetch and cache the application performance data by performing operations including:
identify a type of performance data; and
pre-processing the identified type of performance data using the identified roll up process.

4. The system of claim 3, wherein the roll up process includes raw data received over a predetermined time interval.

5. The system of claim 1, wherein the access pattern includes a predetermined time period access.

6. The system of claim 1, wherein the application performance data includes time needed to complete a business transaction.

7. The system of claim 1, wherein the application performance data includes time need to access a database.

8. The system of claim 1, wherein the application performance data includes a resource usage rate.

9. A method for pre-fetching performance data in a monitored environment, including:
receiving a query for application performance data associated with the monitored environment;
determining whether latency of the received query exceeds a threshold;
recording the query based on the determining that the latency of the received query exceeds the threshold;
learning, via a machine learning process, an access pattern in the recorded query with the latency longer than the threshold, wherein the access pattern includes when and how often a same query is requested;
based on the learned access patterns, pre-fetching and caching the application performance data requested by the recorded query before the same recorded query is requested next time wherein prefetching includes:
identifying a roll up process required by the recorded queries, wherein the roll up process includes processing data into a next granular format;
providing the pre-fetched application performance data from the cache when the same recorded query is requested next time; and
updating the learned access pattern based on data obtained during the next time when the same recorded query is requested.

10. The method of claim 9, including:
determining whether newly streamed performance data are relevant to the pre-fetched and cached performance data; and
appending the pre-fetched and cached data with the newly streamed performance data that are determined to be relevant.

11. The method of claim 9, including:
identifying a type of performance data; and
pre-processing the identified type of performance data using the identified roll up process.

12. The method of claim 11, wherein the roll up process includes raw data in minute interval, average hourly data, average daily data, average weekly data, average monthly data, or average yearly data.

13. The method of claim 9, wherein the access pattern includes a predetermined time period access.

14. The method of claim 9, wherein the application performance data includes time needed to complete a business transaction.

15. The method of claim 9, wherein the application performance data includes time need to access a database.

16. The method of claim 9, wherein the application performance data includes a resource usage rate.

17. A non-transitory computer readable medium embodying instructions when executed by a processor to cause operations to be performed including:
recording a query requesting performance data that has a latency that exceeds a threshold latency time;
learning, by a machine learning process, an access pattern in the recorded query with the latency longer than the threshold, wherein the access pattern includes when and how often a same query is requested;
based on the learned access patterns, pre-fetching and caching the application performance data requested by the recorded query before the same recorded query is requested next time wherein prefetching includes:
identifying a roll up process required by the recorded queries, wherein the roll up process includes processing data into a next granular format; and
providing the pre-fetched application performance data from the cache when the same recorded query is requested next time.

18. The non-transitory computer readable medium of claim 17, wherein the instructions when executed by the processor can cause operations to be performed including:
updating the learned access pattern based on data obtained during the next time when the same recorded query is requested.

19. The non-transitory computer readable medium of claim 17, wherein the instructions when executed by the processor can cause operations to be performed including:
determining whether newly streamed performance data are relevant to the pre-fetched and cached performance data; and
appending the pre-fetched and cached data with the newly streamed performance data that are determined to be relevant.

20. The non-transitory computer readable medium of claim 17, wherein the instructions when executed by the processor can cause operations to be performed including:
identifying a type of performance data; and
pre-processing the identified type of performance data using the identified roll up process.

21. The non-transitory computer readable medium of claim 17, wherein the roll up process includes raw data in a time interval resolution or averaged data over a predetermined time interval.

22. The non-transitory computer readable medium of claim 17, wherein the access pattern includes a predetermined time interval access.

* * * * *

UNITED STATES PATENT AND TRADEMARK OFFICE
CERTIFICATE OF CORRECTION

PATENT NO. : 10,404,822 B2  
APPLICATION NO. : 15/142882  
DATED : September 3, 2019  
INVENTOR(S) : Whitney et al.

Page 1 of 1

It is certified that error appears in the above-identified patent and that said Letters Patent is hereby corrected as shown below:

In the Claims

Column 17, Line 39, please amend as shown:  
requested next time, wherein prefetching includes:

Column 18, Line 25, please amend as shown:  
requested next time, wherein prefetching includes:

Signed and Sealed this  
Third Day of March, 2020

Andrei Iancu  
*Director of the United States Patent and Trademark Office*